United States Patent Office 3,538,190
Patented Nov. 3, 1970

3,538,190
PROCESS FOR PREPARING IMPROVED PLASTIC COMPOSITIONS AND THE RESULTING PRODUCTS
Curtis L. Meredith, Robert E. Barrett, and William A. Bishop, Sr., Baton Rouge, La., assignors to Copolymer Rubber and Chemical Corporation, a corporation of Louisiana
No Drawing. Continuation-in-part of application Ser. No. 626,930, Mar. 30, 1967. This application Mar. 4, 1968, Ser. No. 709,902
Int. Cl. C08f 15/40
U.S. Cl. 260—878
22 Claims

ABSTRACT OF THE DISCLOSURE

Plastics having improved impact resistance are prepared by interpolymerizing a mixture including a rubbery polymer and an alkenyl aromatic monomer such as styrene, a vinyl or vinylidene halide such as vinyl chloride, an acrylic monomer such as acrylonitrile, and mixtures thereof in an organic solvent for the rubbery polymer and in the presence of a free radical catalyst. Novel impact resistant plastic compositions also are provided, in which the rubbery polymer content includes an interpolymer of ethylene, at least one alpha monoolefin containing 3–16 carbon atoms, and a 5-alkylidene-2-norbornene such as 5-ethylidene-2-norborene.

---

This application is a continuation-in-part of copending application Ser. No. 626,930, filed Mar. 30, 1967, for Process for Preparing Improved Plastic Compositions and the Resulting Products.

This invention broadly relates to the preparation of plastics having improved impact resistance. The invention further relates to novel high impact plastic compositions containing a specific rubbery polymer which imparts improved properties.

A wide variety of processes have been proposed heretofore for preparing high impact or gum plastic compositions, which are referred to herein as being rubber modified plastics. The most commonly used commercial process involves a number of steps, reatcions, and treating vessels including preparing a hard and durable styrene-acrylonitrile resin which is brittle and has low impact resistance, preparing in another reaction vessel a highly unsaturated elastomer such as polybutadiene which is capable of absorbing shock, thereafter improving the compatability of the elastomer with the styrene-acrylonitrile resin by grafting monomeric styrene and acrylonitrile thereon, and then blending the styrene-acrylonitrile resin with the grafted elastomer in proportions to arrive at a product which has useful physical properties. Often the prior art process failed to produce a rubber modified plastic having optimum properties in all respects, including processing characteristics, impact resistance, tensile strength and hardness.

A simplified process for the preparation of rubber modified plastics in which the resinous polymer and the grafted rubbery polymer are prepared from the resin-forming monomer or monomers and the ungrafted rubbery polymer would be highly desirable. Such a process could be carried out in a single reaction vessel and other reactions or blending steps would not be necessary. However, an entirely satisfactory process of this type was not available prior to the present invention.

It is an object of the present invention to provide a novel polymerization process for the preparation of rubber modified plastics in which the resinous polymer and the rubbery polymer grafted with the resin-forming monomers may be prepared simultaneously.

It is still a further object to provide rubber modified plastics having improved properties.

Still other objects and advantages of the invention will be apparent to those skilled in the art upon reference to the following detailed description and the examples.

In practicing the present invention, rubber modified plastic compositions are prepared by interpolymerizing a rubbery polymer and one or more alkenyl aromatic monomers, vinyl or vinylidene halides, and/or one or more acrylic monomers, in an organic solvent for the rubbery polymer, and in the presence of a free radical catalyst. It is understood that there are certain preferred variants which produce improved results, as will be described more fully hereinafter.

The organic solvent that is selected must be a solvent for the rubbery polymer. Examples of suitable solvents include aromatic hydrocarbons such as benzene, benzene substituted with one or more alkyl groups containing 1–4 carbon atoms such as toluene, dimethylbenzene, xylene, and their higher homologs including ethyl benzene, diethyl benzene and triethyl benzene, naphthalene, naphthalene substituted with one or more alkyl groups containing 1–4 carbon atoms such as alpha-methyl or beta-methyl naphthalene and their higher homologs, paraffin and cycloparaffin hydrocarbons containing 5–15 carbon atoms, and preferably 6–10 carbon atoms, such as pentane, n-hexane, 3-methylpentane, 2-methylpentane, 2,2- and 2,4-dimethylpentane, heptane, cyclopentane, cyclohexane, and alkyl substituted cyclopentanes and cyclohexanes wherein the alkyl group or groups contain 1–4 carbon atoms, including methyl cyclopentane, methyl cyclohexane and their homologs. The halogenated derivatives of the above solvents may be employed, and especially the chlorine and bromine derivatives. Chlorobenzene is very useful as a solvent.

Mixtures containing two or more of the foregoing solvents may be used, and are prefered in many instances. Examples of solvent mixtures which give unusually good results include one or more aromatic components such as benzene, toluene, xylene and/or ethyl benzene, and one or more paraffin or cycloparaffin hydrocarbon components containing six through eight carbon atoms such as n-hexane, 3-methylpentane, 2-methylpentane, n-heptane, methyl hexanes, n-octane, methyl octanes, methylcyclopentane, and/or cyclohexane.

Usually better results are obtained when the above solvent mixtures contain about 40–60% by weight of the aromatic solvent component, and about 60–40% by weight of the paraffin or cycloparaffin hydrocarbon component. Best results are usually obtained when about 50% by weight of each component is present.

The alkenyl aromatic monomers which may be used in practicing the present invention include alkenyl aromatic hydrocarbons containing 8–20 carbon atoms and their halogenated derivatives. Specific examples include styrene, chlorostyrene, alpha-alkyl styrenes wherein the alkyl group contains 1–8 carbon atoms such as alpha-methyl styrene, alpha-chloro styrene, vinyl naphthalene, alkyl substituted vinyl naphthalenes wherein the alkyl group or groups contain 1–8 carbon atoms, and halogen substituted vinyl naphthalenes. Styrene is preferred in most instances, and the invention is especially useful for the preparation of high impact polystyrene.

The vinyl or vinylidene halides which may be used as monomers include vinyl fluoride, vinyl chloride, vinyl bromide, vinylidene fluoride, vinylidene chloride, and vinylidene bromide. Vinyl chloride, vinylidene chloride and mixtures thereof are preferred species of this group of monomers.

The acrylic monomers which may be used in practicing the invention have the general formula

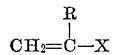

wherein R is selected from the group consisting of hydrogen and alkyl groups having 1–5 carbon atoms, and X is selected from the group consisting of

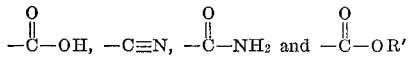

wherein R' is an alkyl group containing 1–9 carbon atoms. Examples of specific acrylic monomers which are especially useful include acrylonitrile, acrylamide, methyl or ethyl acrylonitrile, and acrylic, methacrylic, and ethacrylic acid and the methyl, ethyl, propyl and isopropyl esters thereof. Acrylonitrile is usually the preferred acrylic monomer.

When a mixture of one or more of the alkenyl aromatic monomers and one or more of the acrylic monomers is employed, preferably the ratio by weight of alkenyl aromatic monomer to acrylic monomer is at least 1.5:1, and between 2:1 and 4:1 for better results. The optimum properties are obtained in many instances with styrene and acrylonitrile at ratios by weight of 67:33 to 78:22, or about 2.5:1. The preferred monomers for use in preparing the monomer mixtures are usually styrene and acrylonitrile.

The rubbery polymers which may be used in practicing the present invention include those used in prior art processes for preparing high impact polystyrene or styrene-acrylonitrile plastics. Examples of highly unsaturated or diene rubbers include those prepared by homopolymerizing the various 1,3-butadienes, such as 1,3-butadiene, 2-methylbutadiene-1,3, piperylene, and 2,3-dimethylbutadiene-1,3. Rubbery interpolymers of the 1,3-butadienes and one or more monomers interpolymerizable therewith may be used. Examples include interpolymers prepared from monomeric mixtures containing the aforementioned 1,3-butadienes and up to 50% by weight, or more in some instances, of an ethylenically unsaturated compound which contains a $CH_2=C=$ group, wherein at least one of the disconnected valences is attached to an electroactive group which substantially increases the polar character of the molecule. Examples of compounds copolymerizable with the 1,3-butadienes are the aryl olefins such as styrene alpha-methyl styrene and vinyl naphthalene, the alpha-methylenecarboxylic acids and their esters, nitriles and amides, such as acrylic acid, methylacrylate, methylmethacrylate, acrylonitrile, methylacrylonitrile and methylacrylamide. Specific examples of diene rubbers which are especially preferred include the styrene-butadiene rubbers containing less than 50% by weight of bound styrene, the various polybutadiene and polyisoprene synthetic rubbers including the high cis-1,4- and high trans-1,4-stereoisomers and polymers containing mixtures thereof, and the acrylonitrile-butadiene rubbers. Natural rubber also may be used.

Certain synthetic elastomers characterized by a relatively low level of unsaturation are often preferred as the high impact plastic compositions prepared therefrom have markedly higher oxidation resistance and better weathering properties. Also, much less antioxidant may be used, or it may be eliminated in some instances, and this reduces the cost of manufacture and aids in keeping the non-polymer content at a minimum. Examples of rubbery polymers having a low level of unsaturation include the rubbery interpolymers of ethylene and at least one alpha monoolefin containing 3–16 carbon atoms, rubbery interpolymers of ethylene and at least one polyene, rubbery interpolymers of ethylene, at least one alpha monoolefin containing 3–16 carbon atoms and at least one polyene (EPDM rubber) and rubbery interpolymers of isobutene and at least one polyene. Specific examples of rubbers having low unsaturation include ethylenepropylene rubbery copolymers (EPM rubber) ethylenepropylenediene rubbery interpolymers, and butyl rubber. Commercial butyl rubber is usually a copolymer of isobutene and approximately 1–5% by weight, and preferably about 2% by weight, of isoprene. With the exception of butyl rubber, the preferred polyene in the above rubbery polymers is usually a nonconjugated diene.

The preparation and properties of the foregoing rubbers are well known and are described in a large number of issued United States patents and other publications, including the following: Introduction to Rubber Technology, edited by M. Morton, Reinhold Publishing Corporation, New York (1959); Synthetic Rubber Technology, volume I, by W. S. Penn, Maclaren and Sons, Ltd., London (1960); Rubber, Fundamentals of Its Science and Technology, J. LeBras, Chemical Publishing Company, Inc., New York (1957); and Linear and Stereoregular Addition Polymers, N. G. Gaylord, et al., Innerscience Publishers, New York (1959). Typical commercially available elastomers of the foregoing types are described in the text "Compounding Ingredients for Rubbers," 3rd edition, Cuneo Press of New England, Cambridge, Mass. The above publications are incorporated herein by reference.

The preferred elastomers having low unsaturation are products resulting from interpolymerizing a monomeric mixture containing 10–90 mole percent of ethylene, 10–90 mole percent of at least one other straight chain alpha monoolefin containing 3–16 carbon atoms which preferably is propylene, and 0.1–10 mole percent of a polyunsaturated bridged-ring hydrocarbon having at least one carbon-to-carbon double bond in a bridged ring, in solution in hexane or other organic polymerization solvent, and in the presence of a catalyst prepared from vanadium oxytrichloride and methyl or ethyl aluminum sesquichloride or other suitable Ziegler catalyst. Rubbery copolymers of ethylene and propylene, and rubbery terpolymers of ethylene, propylene and an open chain nonconjugated diene are also useful. The preparation of the above rubbery polymers is disclosed in United States patents such as 2,933,480, 3,093,620, 3,093,621, 3,211,709, 3,113,115 and 3,300,459, the teachings of which are incorporated herein by reference.

It is preferred that the elastomers having low unsaturation be prepared from a monomeric mixture containing ethylene propylene and the polyunsaturated bridged-ring hydrocarbon, in proportions to produce a polymers having good elastomeric properties and an unsaturation level of at least 2 carbon-to-carbon double bonds per thousand carbon atoms in the polymer. For example, the elastomer may contain chemically bound therein molar ratios of ethylene to propylene varying between about 80:20 and 20:80, and between 70:30 and 55:45 for better results. The bridged-ring hydrocarbon may be chemically bound therein in an amount to provide an unsaturation level of 2–25, and preferably about 3–16 carbon-to-carbon double bonds per thousand carbon atoms in the polymer.

Examples of the bridged ring hydrocarbons include the polyunsaturated derivatives of bicyclo(2,2,1)-heptane wherein at least one double bond is present in one of the bridged rings, such as dicyclopentadiene, bicyclo(2,2,1) hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged-ring hydrocarbons include polyunsaturated derivatives of bicyclo(2,2,2)-octane as represented by bicyclo(2,2,2)octa-2,5-diene, polyunsaturated derivatives of bicyclo(3,2,1)-octane, polyunsaturated derivatives of bicyclo(3,3,1)-nonane, and polyunsaturated derivatives of bicyclo(3,2,2)-nonane. At least one double bond is present in a bridged ring of the above compounds, and at least one other double bond is present in a bridged ring or in a side chain. Specific examples of bridged ring compounds include 5-methylene-2-norbornene, 5 - ethylidene - 2 - norbornene, 5-isopropylidene-2-norbornene, dicyclopentadiene, the methyl butenyl norbornenes such as 5 - (2 - methyl-2-butenyl)-2-norbornene, or 5 - (3 - methyl - 2 - butenyl)-2-norbornene and 5-(3,5-dimethyl - 4 - hexenyl) - 2 - norbornene. The elastomers prepared from ethylene, at least one monoolefin containing 3–16 carbon atoms, and the 5 - alkylidene-2-norbornenes, wherein the alkylidene group contains 1–20 and preferably 1–8 carbon atoms, produce novel rubber modified plastics which have exceptional properties. The elastomer prepared from 5 - ethylidene - 2 - norbornene is much preferred as it has outstanding properties and produces many unusual and unexpected results when used as the elastomer in the plastic compositions of the invention. As a result, this elastomer is in a class by itself.

Mixtures of two or more of the elastomers disclosed herein may be used, and often improved results may be obtained. For instance, blending EPDM rubber and/or EPM rubber with highly unsaturated diene rubbers such as high cis-1,4-polybutadiene improves the low temperature Izod impact values, as compared with using pure EPDM or EPM rubber, and increases ozone resistance, as compared with using diene rubber alone. The blends may contain 5–95 parts by weight, and preferably 20–30 parts by weight, of low unsaturated rubbers such as EPDM or EPM, and 95–5 parts by weight, and preferably 80–70 parts by weight, of highly unsaturated rubber such as the diene rubbers, including natural rubber. Best results are usually obtained when the blend contains about 75 parts by weight of the diene rubber and about 25 parts by weight of EPDM. It is also preferred that the EPDM be relatively highly unsaturated, i.e., the EPDM should contain at least 7, and preferably 10–25, carbon-to-carbon double bonds per 1000 carbon atoms. Mixtures or blends of two or more EPDM rubbers may be used to arrive at a desired average unsaturation level.

In instances where an elastomer is employed which has no unsaturation or very little unsaturation, then it is often desirable to prepare a hydroperoxide thereof by oxidation prior to the polymerization step of the present invention. The oxidation may be in accordance with prior art practice, such as by heating a solution of the elastomer in the presence of molecular oxygen and an organic peroxide or hydroperoxide as a catalyst. In one suitable method, the elastomer is dissolved in amixture of benzene and hexane, and benzoyl peroxide is added as a catalyst for the oxidation The reaction vessel is pressurized to 50 p.s.i. with oxygen and maintained at 70° C. for 0.5 to 8 hours. Oxidation can also be affected without a free radical catalyst by reacting for 2 to 10 hours. The resin monomers are added to the solution of the oxidized rubber, with or without adding an additional free radical catalyst, and polymerized to form a rubber modified plastic according to the present invention. The hydroperoxide groups may alone act as the free radical catalyst for the monomer polymerization. It is understood that the elastomer may be oxidized to form hydroperoxide groups thereon whenever there is difficulty in reacting the elastomer substrate with the graft monomer or monomers in the desired amounts to thereby achieve greater ease of grafting.

A wide variety of free radical polymerization catalysts may be employed, including those used in the prior art processes for preparing high impact polystyrene and styrene-acrylonitrile plastics. In some instances, the hydroperoxide groups that are formed by oxidation of the rubbery component may act as the free radical catalyst. Examples of free radical polymerization catalysts include the organic peroxides such as benzoyl peroxide, lauroyl peroxide, propionyl peroxide, 2,4-dichlorobenzoyl peroxide, acetyl peroxide, tertiary butyl hydroperoxide, paramenthane hydroperoxide, teritary butyl perbenzoate, tertiary butyl peroxyisobutyrate, and dicumylperoxide. Mixtures of one or more of the above or other peroxides and hydroperoxides may be employed. Additionally, mixtures of one or more peroxides and/or hydroperoxides with azo-bisdiisobutyronitrile give better results in some instances, and especially where a less active catalyst is effective. For example, when using the highly unsaturated diene rubbers, or rubbers of low or high unsaturation that have been subjected to an oxidation step to form hydroperoxide groups thereon, then a less active free radical catalyst should be used for optimum results. The catalyst mixture may contain 25–75% and prferably about 50% by weight of the azobisdiisobutyronitrile, and 75–25%, and preferably about 50% by weight, of one or more of the above organic peroxides. In instances where an unoxidized elastomer is used having a low degree of unsaturation, then it is desirable to employ a highly active free radical initiator, e.g., a prior art initiator which is known to abstract hydrogen from the elastomer and rapidly catalyze the graft reaction. Many examples of such highly active free radical initiators are known, such as benzoyl peroxide.

The amount of the alkenyl aromatic monomer and/or the acrylic monomer that is grafted on the elastomer during the polymerization step should be sufficient to provide a desirable, and preferably an optimum, degree of compatibility with the resin that is formed simultaneously. For example, the resin-forming monomer or monomers may be grafted on the elastomer in an amount to provide a ratio by weight of the grafted monomeric material to the elastomer between 1:4 and 4:1, and preferably between 1:4 and 2:1. The best results are usually obtained when about 30–120 parts by weight of the resin-forming monomer or monomers are grafted on each 100 parts by weight of the rubbery polymer.

The reaction mixture to be polymerized should contain about 1–50 parts by weight, and preferably 4–25 parts by weight, of the rubbery polymer for each 99–50 parts by weight, and preferably 96–75 parts by weight, of the alkenyl aromatic monomer and/or the acrylic monomer. The monomeric material may be one or more alkenyl aromatic monomers, or one or more acrylic monomers, or a mixture thereof in the ratios previously mentioned. The reaction mixture also should contain about 0.25–2.5 parts by weight, and preferably 0.5–1.3 to 0.75–1.1 parts by weight of the free radical catalyst or initiator for each 100 parts by weight of resin-forming monomer or monomers. The reaction mixture may contain about 35–90% by weight, and preferably 50–75% by weight, of solvent based on the total weight of reaction mixture. Additionally, much better results are achieved when the organic solvent content of the reaction mixture is varied between not less than 35% and preferably not less than 50% by weight of the total weight of the reaction mixture at the lower limit of the rubbery polymer content mentioned above, and not more than 90% and preferably not more than 75% by weight thereof when the upper rubbery polymer limit is used. When the preferred rubbery polymer range mentioned above is used, i.e., 4–25% by weight, then the solvent should be present in an amount of about 85–60% by weight of the total reaction mixture. It is understood that the solvent is always present in an amount to dissolve the rubber and form a solution thereof at the time of commencing the reaction, and especially when an EPDM rubber is employed.

The temperature of the polymerization may vary over wide ranges. For instance, reaction temperatures of approximately 30–150° C., and perferably about 60–80° C. with certain catalysts such as benzoyl peroxide, are usually satisfactory. The polymerization is continued for a sufficient period of time to assure a desired percent conversion of the monomer or monomers. This will vary somewhat with the specific catalyst, solvent, rubbery polymer, monomers, and reaction temperature that are employed. However, reaction times of about 4–24 hours are usually satisfactory. In any event, preferably the reaction is continued until at least 60% by weight of the monomeric material initially present has been converted to polymer, and for best results 85–100% by weight. The amount of monomeric material converted to polymer may be determined by volatilizing the volatile monomeric components of the reaction mixture, weighing the nonvolatile components and calculating the percent by weight conversion therefrom.

The reaction mixture also may contain a crosslinking agent, i.e., a compound containing at least two reactive sites such as two or more ethylenic double bonds. Examples of crosslinking agents are divinylbenzene, divinyl ether of diethylene glycol, triallylcyanurate, and 1,3-butylene-dimethacrylate. The crosslinking agent may be added in an amount of, for example, 0.005–1.0 parts by weight, and preferably about 0.01 to 0.5 part by weight, per 100 parts by weight of the monomeric material to be polymerized. Still other types of crosslinking agents may be employed as it is only necessary that it have two or more reactive sites under the conditions of the polymerization.

The reaction mixture may be agitated during the polymerization but vigorous agitation is not necessary. As the polymerization proceeds, the resinous polymer that is formed generally precipitates in a finely dispersed form and remains suspended in the reaction mixture. The rubbery polymer generally remains dissolved in the solution after it has been grafted with the resin-forming monomers. Thus, the polymerization may produce simultaneously one or more resinous homopolymers of the monomer or monomers present, a resinous interploymer when two or more resin-forming monomers are present, and the rubbery polymer grafted with one or more of the resin-forming monomer or monomers. As a result, at the end of the polymerization the reaction mixture contains all of the components that are needed for a high impact plastic composition, and it is only necessary to recover the products of the polymerization therefrom.

The preceding discussion has been concerned largely with polymerization without incremental addition of solvent and/or initiator during the course of the reaction. In accordance with still further preferred variants of the invention, a mixed aromatic-aliphatic solvent such as benzene-hexane is employed in combination with incremental addition of the solvent alone, incremental addition of the initiator alone, incremental addition of solvent and initiator, or incremental addition of a solvent component so that the relative amount of the aromatic component is decreased as the polymerization proceeds, with or without incremental initiator addition. While each of the above techniques of incremental addition offer advantages over polymerization without incremental addition, the incremental addition of solvent and initiator, and preferably with a change in the aromatic-aliphatic solvent ratio so that the aromatic component is decreased as the polymerization proceeds, produces the best results.

When the ratio of the aromatic and aliphatic solvent components is not changed during the polymerization, then the weight ratio of the aromatic component to the aliphatic component should be between about 60:40 and 40:60, and preferably about 50:50 for better results. When incremental addition of solvent is practiced, then the weight ratio of aromatic to aliphatic solvent may be between 65:35 initially and 35:65 at the end of the polymerization, and preferably between 60:40 initially and 40:60 at the end of the polymerization. The total amount of solvent in the reaction mixture at the end of the reaction need not differ from that previously mentioned, i.e., it may be 35–80% by weight of the total weight of the reaction mixture, and preferably 50–75% by weight.

The total amount of initiator that is added in the incremental addition technique need not differ from the quantity normally employed; however, usually the initiator is more efficient and thus smaller quantities may be used. This reduces the overall cost and is preferred.

The weight percentages of initiator and/or solvent that are added during the course of the polymerization are fractional amounts of the quantities present in the final reaction mixture. The fractional amounts of initiator added by incremental addition may be 0–75%, and preferably 20–50% by weight of the total. The amount of solvent added by incremental addition may be 0–50%, and preferably 20–40% of the total weight of solvent in the final reaction mixture.

In instances where benzoyl peroxide is the initiator, the reaction temperature may be 68–85° C., and preferably 72–82° C. For other initiators, better results are obtained when the reaction temperature limits are selected so that the initiaor half-life is between 2 and 13 hours.

The time interval or intervals at which solved and/or initiator are added are determined primarily by the amount of initiator to be added after the start of the reaction and by the reaction temperature. A higher reaction temperatures, it is desirable that the addition be made later in the reaction and multiple additions are often preferred. The time of making the addition may be between one-seventh and six-sevenths of the total reaction time that is necessary to achieve at least 90% by weight conversion of the monomers. A plurality of incremental additions may be made, such as 2–5 or more.

The incremental addition technique may be used very effectively in a continuous polymerization wherein a series of reactors is employed, with the polymerization being carried out to a desired degree of conversion in the first reactor, the resulting reaction mixture then passed to the second reactor, and so on through the series. Incremental addition of solvent and/or initiator may be made to one or more reactors to thereby achieve optimum properties in the reinforced plastic product which is withdrawn from the final reactor in the series. Reaction conditions such as temperature, pressure, concentrations and ratios of reactants may also differ from reactor to reactor. By way of example, in a continuous polymerization using two reactors, benzoyl peroxide as a catalyst, and a mixture of styrene and acrylonitrile as the monomers, the first reactor may be operated at a temperature of 72–78° C. until 10–30 percent by weight of the monomer content is converted to polymer, the partially polymerized mixture is passed to the second reactor, and the polymerization is continued until 10–95% by weight of the monomer content is converted to polymer, and preferably at a higher reaction temperature such as 75–82° C. which assures faster and more complete polymerization.

Incremental addition has a number of beneficial effects such as a higher Izod impact strength in the product, a better balance of Izod impact strength and flow properties, a more efficient utilization of the initiator, and a much faster reaction time which may be reduced to as little as six hours, as compared with the usual 12–14 hours for at least 90% by weight conversion of the monomers to polymer. A number of further advantages are obtained when the ratio of aromatic component to aliphatic component in the solvent is relatively high during the initial stages of the reaction, and is decreased during the polymerization.

The plastic composition may be recovered from the reaction mixture by coagulation with a lower alcohol such as methyl, ethyl or isopropyl alcohol, by flashing off the solvent, or by an extrusion-devolatilization step. When the product is recovered by flashing the solvent, preferably the reaction mixture is passed into a vessed containing boiling water. Steam is supplied to the vessel and the solvent evaporates and is removed overhead as a vapor, together with any free monomer content. The plastic product is recovered as a solid in particulate form, and it may be dewatered, washed in water to remove water soluble impurities, and dried in a prior art oven at 50–100° C. until the water content is removed. Fluidized bed drying at 50–100° C. also may be used in most instances with good results. The dried plastic composition may be pelletized or formed into other desirable shapes suitable for marketing.

Prior art antioxidants, processing aids, and other compounding ingredients and aids may be added at any convenient point in the process. Inasmuch as these ingredients are soluble or dispersible in the organic solvent, they may be added to the polymerization mixture and may be dissolved or dispersed therein prior to recovery of the product. Examples of suitable antioxidants include phosphited polyalkyl polyphenols and tri(mixed monononyl-dinonyl) phenyl phosphite. Examples of processing aids are mineral oils and the salts and esters of higher fatty acids. When desired, coloring agents may be added to produce colored resins. The coloring pigments of the prior art are suitable for this purpose.

The high impact plastic compositions prepared by the process of the invention have better physical properties such as impact resistance, hardness and tensile strength than similar products of the prior art. Additionally, by using the preferred rubbery polymers of the invention having low unsaturation such as the terpolymers of ethylene, propylene and 5-alkylidene-2-norbornene, even better physical properties may be obtained. The novel plastic composition of the invention comprises (A) a resinous polymer, which may be one or more homopolymers of the alkenyl aromatic monomers or one or more interpolymers of the alkenyl monomers and acrylic monomers, and (B) a graft interpolymer of (1) a rubbery interpolymer of ethylene, at least one alpha monoolefin containing 3–16 carbon atoms, and 5-alkylidene-2-nonbornene, and (2) monomeric material which may be one or more alkenyl aromatic monomers or acrylic monomers, or mixtures thereof. The alkylidene group contains 1–8 carbon atoms, and the preferred species is 5-ethylidene-2-norbornene. High impact plastics prepared from terpolymers of ethylene, propylene and 5-ethylidene-2-norbornene have a good balance of properties and many unusual and unexpected properties including a high heat distortion temperature, an ability to be processed repeatedly without degradation, a unique degree of platability, high Izod impact values, a high melt flow activation energy, and an exceptional resistance to falling dart impact. The combination of a high heat distortion valve and good processing characteristics is most unusual.

The preferred monomers for use in preparing the above products are styrene, or styrene and acrylonitrile. The novel plastic compositions may contain the ratios of components previously mentioned, and may be prepared by the process of the invention using the ratios of reactants previously mentioned.

The foregoing detailed description and the following specific examples are for purposes of illustration only, and are not intended as being limiting to the spirit or scope of the appended claims.

EXAMPLE I

This example illustrates the preparation of a rubber modified polystyrene by the process of the invention. The terpolymer was an interpolymer of ethylene, propylene, and 5-ethylidene-2-norbornene which contained chemically bound therein approximately equal weights of ethylene and propylene, and sufficient 5-ethylidene-2-norbornene to provide an unsaturation level of 8.7 carbon-to-carbon double bonds per 1000 carbon atoms. The Mooney value was 66 (ML–4).

5.5 grams of the rubbery terpolymer was dissolved in 49.5 grams of hexane and charged to a laboratory autoclave fitted with an agitator. Thereafter the autoclave was charged with 28.6 grams of chlorobenzene, 54.5 grams of styrene and 0.55 gram of dicumylperoxide. The temperature of the reaction mixture was raised to 115° C. to initiate the reaction. The reaction was continued at this temperature for 22 hours, at which time 98% by weight of the styrene had reacted.

The product was precipitated from the reaction mixture by addition of alcohol. The solid product was dewatered, washed in water to remove water soluble impurities, dried and tested. The resulting rubber modified polystyrene had a Rockwell hardness of 102 ("R" scale) as determined by ASTM D 785–65, Procedure B.

A sample of the product was molded, and then aged for 66 hours at 120° C. No discoloration was observed. Three commercial high impact polystyrenes which contained a diene rubbery component were tested under the same conditions and discolored badly.

EXAMPLE II

This example illustrates the preparation of high impact styrene-acrylonitrile plastics by the process of the present invention using a variety of mixed solvent systems, rubbery polymers and amounts of rubbery polymers. All ratios and percentages mentioned in this example are calculated by weight, and the weights are given in grams.

The rubbery polymer was dissolved in sovlent. The reaction vessel was charged with the solvent mixture and rubbery polymer, and the styrene and acrylonitrile monomers were charged in a weight ratio of styrene to acrylonitrile of 3:1. Benzoyl peroxide was added as the catalyst, and the temperature was raised to 70° C. to initiate the reaction. The reaction was continued at 70° C. over a 20 hour period with agitation. This resulted in substantially 100% by weight conversion of the styrene and acrylonitrile monomers to polymer for all runs with the exception of Run No. 2, where the conversion was 96% by weight.

The resulting high impact styrene-acrylonitrile plastic was precipitated from the reaction mixture by addition of isopropyl alcohol. The product precipitated in the form of small particles, which were collected, washed with water to remove water soluble impurities and dried. The plastic

TABLE I

| Run No. | Solvent composition | Rubber, grams | Rubber unsaturation, C=C/1,000 C | Rubber in plastic (wt. percent) | Styrene-acrylonitrile, grams (3/1 ratio) | Benzoyl peroxide, grams | Rockwell hardness ("R" scale) | Izod impact resistance, ft. lbs./in. of notch | Tensil strength, p.s.i. |
|---|---|---|---|---|---|---|---|---|---|
| 1 | 170 g. toluene / 170 g. hexane | 15.0 | 12.9 | 10.4 | 130 | 1.30 | 104 | 6.30 | |
| 2 | 105 g. chlorobenzene / 205 g. hexane | 20.0 | 12.9 | 11.2 | 165 | 1.65 | 101 | 3.15 | |
| 3 | 175 g. benzene / 175 g. heptane | 20.0 | 12.9 | 10.8 | 165 | 1.65 | 101 | 3.07 | |
| 4 | 120 g. benzene / 105 g. hexane / 105 g. cyclohexane | 20.0 | 12.9 | 10.8 | 165 | 1.65 | 97 | 4.54 | |
| 5 | 170 g. benzene / 170 g. hexane | 9.0 | 9.8 | 5.1 | 164 | 1.64 | 117 | 0.92 | 8,700 |
| 6 | 170 g. benzene / 170 g. hexane | 15.0 | 9.8 | 10.4 | 130 | 1.30 | 105 | 2.84 | 7,540 |
| 7 | 170 g. benzene / 170 g. hexane | 20.0 | 9.8 | 15.0 | 112 | 1.12 | 95 | 10.8 | 6,450 |
| 8 | 175 g. toluene / 175 g. hexane | 20.0 | 9.8 | 10.8 | 165 | 1.65 | 106 | 4.62 | 7,100 |
| 9 | 175 g. toluene / 175 g. heptane | 20.0 | 9.8 | 10.8 | 165 | 1.65 | 106 | 6.41 | 7,700 | products were tested for tensile strength, Rockwell hardness ("R" scale), and Izod impact resistance. Conventional test procedures were used in each instance. The Rockwell hardness was determined by ASTM D 785–65, Procedure B, the Izod impact resistance was determined by ASTM D 256–56, Method A, and the tensile strength was determined by ASTM D 638–61T. The data thus obtained are recorded in preceding Table I.

It is apparent from the data in Table I that excellent high impact plastics are produced by the one-step process of the invention. Very satisfactory high impact plastics are produced when the procedure of this example is modified to substitute the other rubbers, monomers, catalysts and solvents mentioned herein for those appearing in Table I.

EXAMPLE III

This example presents data for the purpose of comparing the physical properties of the rubber modified plastics of the present invention with those of the prior art.

Three of the best commercially available acrylonitrile-butadiene-styrene (ABS) high impact plastics were purchased which had rubber contents of 5.5%, 10.7% and 15.0% by weight, respectively. The rubber content in each instance was polybutadiene.

Three plastics were prepared by the general procedure of Example II which had rubber contents of 5.5%, 10.7% and 15.0% by weight, respectively. The rubber in each run was a terpolymer of ethylene, propylene and 5-ethylidene-2-norbornene.

The above six plastics were tested to determine the Rockwell hardness ("R" scale) and Izod impact resistance by the methods of Example II. The data thus obtained are compared in Table II. It is apparent from these data that the one step process of the invention produces plastics having better properties than the best commercially available products.

TABLE II

| Rubber content of plastics, weight percent | Rockwell hardness ("R" Scale) | | Izod impact resistance, ft. lbs./inch of notch | |
|---|---|---|---|---|
| | Commercial plastics | Plastics of Example III | Commercial plastics | Plastics of Example III |
| 5.5 | 113 | 115 | 0.7 | 1.1 |
| 10.7 | 108 | 110 | 2.9 | 4.7 |
| 15.0 | 98 | 98 | 5.6 | 6.6 |

EXAMPLE IV

This example followed the general procedure of Example II except as noted. The rubber was a commercially available high cis-1,4-polybutadiene, the solvent was a mixture containing 60% by weight benzene and 40% by weight hexane, the initiator was azo-bisdiisobutyronitrile in an amount to provide 0.66 gram per 100 parts by weight of monomer, the concentration of the styrene and acrylonitrile monomers in the total reaction mixture was 33% by weight, the rubber content in the reactants and product was 8.9% by weight, and the reaction was at 70° C. for 16 hours.

The resulting plastic product was tested following ASTM D 1706–61 for determining Shore D hardness, and the drop dart test for determining impact strength. The Shore D hardness was 76, and in the impact test, the sample withstood the impact energy of 160 inch pounds.

EXAMPLE V

This example followed the general procedure of Example II except as noted. The rubber was a commercially available polybutadiene having 35–45% trans-1,4-addition, 45–55% cis-1,4-addition, and a small amount of 1,2-addition, and amorphous material. The rubber content in the reactants and product was 9.3% by weight, the solvent was a mixture containing 50% by weight of benzene and 50% by weight of hexane, the concentration of the styrene and acrylonitrile monomers in the total reaction mixture was 28% by weight, and the initiator was 1.0 gram of a mixture of benzoyl peroxide and azo-bisdiisobutyronitrile in a weight ratio, respectively of 3:1.

The resulting plastic product was tested as in Example IV. The Shore D hardness was 75, and in the impact test, the sample withstood the impact energy of 160 inch pounds.

EXAMPLE VI

This example followed the general procedure of Example II except as noted. The rubber was commercial butyl rubber, the rubber content of the reactants and product was 10% by weight, the solvent was a mixture containing 52% by weight of benzene and 48% by weight of hexane, the concentration of the styrene and acrylonitrile monomers in the total reaction mixture was 25% by weight, and the initiator was 1.0 gram of benzoyl peroxide.

The resulting plastic product was tested as in Example IV. The Shore D hardness was 82 and in the impact test, the sample withstood the impact energy of 160 inch pounds.

EXAMPLE VII

Samples of a commercially available ABS plastic containing 15.0% by weight rubber (polybutadiene) and a plastic of the invention containing 15.0% by weight rubber (ethylenepropylene-5-ethylidene terpolymer) were aged for 60 hours at 120° C. The aged samples were tested to determine the Izod impact values.

The plastic of the invention had an Izod unnotched impact value of 36.4 ft. lbs./in. of notch prior to aging, and an unnotched impact value of 33.5 after aging. The commercial plastic had an Izod unnotched impact value of 32.8 ft. lbs./in. of notch prior to aging, and an unnotched impact value of 7.0 after aging. Thus, before aging the plastic of the invention had an impact resistance 11.0% greater than the commercial product, and 378% greater after aging.

EXAMPLE VIII

This example followed the general procedure of Example II except as noted. The elastomer was an interpolymer of ethylene, propylene and dicyclopentadiene containing an ethylene:propylene mole ratio of 58:42 and 3% by weight of dicyclopentadiene. The solvent was a mixture containing 48% by weight of benzene and 52% by weight of hexane, and the initiator was benzoyl peroxide in an amount to provide 1.00 part per 100 parts by weight of monomers. The concentration of the styrene and acrylonitrile monomers in the reaction mixture was 23%. The conversion of the monomers was 86% after 16 hours at 70° C. and the resulting plastic contained 16% of elastomer by weight.

The plastic product was tested as in Example IV. The Shore D hardness was 77 and the sample shattered under a falling dart impact of 160 inch pounds.

An ethylene-propylene-dicyclopentadiene interpolymer, of the composition described above, was dissolved in 182 grams of hexane in an amount sufficient to make a 9% solution by weight. The solution was placed in a vessel, 0.7 gram of benzoyl peroxide was added and the vessel pressurized to 50 p.s.i. with oxygen. The elastomer was oxidized at a temperature of 70° C. After 4 hours, 200 g. of benzene, 133 g. of styrene and acrylonitrile monomers, and 0.7 g. of benzoyl peroxide was added to the vessel and the temperature was maintained at 70° C. for 16 hours. The resulting plastic contained 11% elastomer.

The sample was tested as in Example IV. The Shore D hardness was 73 and the sample withstood a falling dart impact of 160 inch pounds.

EXAMPLE IX

In this example, a high impact plastic is prepared from an oxidized elastomer according to the procedure in Example VIII, with the exception of substituting a copolymer of ethylene and propylene containing 58 mole percent of ethylene, for the ethylene-propylene dicyclopentadiene interpolymer. Also, the ethylene-propylene copolymer is added in an amount so that the resulting high impact plastic contains 22% by weight thereof.

The high impact plastic product is tested by the methods given in Example II and Example IV. The Rockwell hardness ("R" scale) is 100 and the sample is capable of withstanding a falling dart impact of 160 inch pounds.

EXAMPLE X

A series of solutions were prepared that contained 14.4 g. of an ethylene-propylene-dicyclopentadiene interpolymer, 186 g. of hexane, 200 g. of benzene, and 133 g. of styrene and acrylonitrile monomers. Different amounts of benzoyl peroxide and/or azo-bisdiisobutyronitrile as a catalyst were added to each of the solutions, as shown in Table III.

The above prepared solutions were polymerized at a temperature of 70° C. for 16 hours. The resulting plastic products were recovered and tested in accordance with Example IV. The data thus obtained are recorded below in Table III. The degree of graft refers to the parts by weight of styrene and acrylonitrile that was grafted on each 100 parts by weight of the interpolymer.

TABLE III

| Benzoyl Peroxide (grams) | Azo-bisdiisobutyronitrile, (grams) | Degree of graft | Shore D hardness | Falling dart impact (160 in. lbs.) |
| --- | --- | --- | --- | --- |
| 1.33 | None | 31 | 82 | Very good. |
| 1.06 | 0.17 | 19 | 80 | Shattered. |
| 0.53 | 0.53 | 16 | 81 | Shattered. |
| 0.27 | 0.70 | 11 | 81 | Shattered. |

EXAMPLE XI

Various terpolymers were used in preparing a series of high impact plastics. With the exception of the types of the elastomers that were used, the general procedure of Example II was followed. The terpolymers of this example, which were substituted for the terpolymers of Example II, had a mole ratio of chemically bound ethylene to propylene of about 60:40, and contained a chemically bounded polyene in the following amounts in each instance:

(1) Dicyclopentadiene in an amount to provide 6.0 carbon-to-carbon double bonds per 1000 carbon atoms. The plastic contained 9.9% by weight of this terpolymer.

(2) 5-(3,5-dimethyl-4-hexenyl)-2-norbornene in an amount to provide 4.0 carbon-to-carbon double bonds per 1000 carbon atoms. The plastic contained 8.8% by weight of this terpolymer.

(3) 5-butylene-2-norbornene in an amount to provide 3,4 carbon-to-carbon double bonds per 100 carbon atoms. The plastic contained 8.7% by weight of this terpolymer.

(4) 1,4-hexadiene in an amount to provide about 3 carbon-to-carbon double bonds per 1000 carbon atoms. The plastic contained 8.0% by weight of this terpolymer.

(5) 5-methylene-2-norbornene in an amount to provide about 3-carbon-to-carbon double bonds per 1000 carbon atoms. The plastic contained 8.8% by weight of this terpolymer.

(6) 5-ethylidene-2-norbornene in an amount to provide 3.7 carbon-to-carbon double bonds per 1000 carbon atoms. The plastic contained 7.9% of this terpolymer.

The resulting plastic products were recovered and tested in accordance with Example IV. Only the plastic prepared from the terpolymers containing 5-methylene-2-norbornene and 5-ethylidene-2-norbornene as a monomer withstood the falling dart test without shattering.

EXAMPLE XII

This example illustrates the preparation of rubber modified plastics without incremental addition of initiator or a benzene-hexane solvent with incremental addition of benzene-hexane solvent but without changing the ratio of the solvent components, incremental addition of initiator only, incremental addition of benzene-hexane solvent and initiator, and incremental addition of the solvent with a change in the ratio of solvent components.

An agitated reaction vessel provided with means for adding the initiator and/or solvent increments was employed in the runs illustrated in Table IV appearing hereinafter, using the conditions of reaction for each run which are set out in the table, such as time, temperature, and incremental addition of solvent and/or initator.

The total quantities of the components in the final reaction mixtures were as follows:

| Component— | Parts by weight |
| --- | --- |
| Solvent (benzene and hexane) | 1,080 |
| Styrene | 345 |
| Acrylonitrile | 115 |
| EPDM rubber | 63.0 |
| Benzoyl peroxide | 4.60 |

The EPDM rubber was a terpolymer of ethylene, propylene and 5-ethylidene-2-norbornene which contained chemically bound therein approximately equal weights of ethylene and propylene, and sufficient 5-ethylene-2-norbornene to provide an unsaturation level of nine carbon-to-carbon double bonds per 1000 carbon atoms. The EPDM rubber had an ML-8 (250° F) Mooney viscosity of 60.

The percentages of initiator and/or solvent which were added as increments during the course of the polymerizations were fractional amounts of the total quantities in the final mixtures. In the accompanying Table IV, it may be noted that as many as five incremental additions were made.

After completing a polymerization run, the resulting rubber modified plastic product was recovered by steam coagulation, dried and tested. The notched Izod impact value was determined by ASTM D 256–56 (⅛ inch specimen), and the melt flow index was determined by ASTM D 1238–62T (condition G).

Upon reference to the data in Table IV, it may be noted that incremental addition results in at least four advantages, as follows:

(1) Higher impact strength;
(2) A better balance of impact strength and melt flow index properties;
(3) A much faster reaction time; and
(4) A more efficient utilization of the initiator.

Some of the more pertinent observations which may be made from a run or group of runs appearing in Table IV are given below:

(1) Runs 1, 2 and 3 were conducted under standard or basic reaction conditions without incremental addition of solvent or initiator. The Izod impact value/melt flow index balance and the effect of a higher reaction temperature may be noted.

(2) Runs 4 and 5 illustrate the effect of incremental addition of solvent only, without changing the ratio of solvent components. There is some improvement over Runs 1, 2 and 3 in the melt flow index, and the effect of changing the solvent ratio may be noted by comparing this date with that for Runs 17 and 18.

(3) Run 6 illustrates the effects of incremental addition of the initiator only.

(4) Run 7 may be compared with Runs 8–15 to observe the effect of reaction temperature of the Izod impact value/melt flow index balance.

(5) Runs 9, 10, 12 and 14 illustrate the results that are obtained by incremental addition of solvent without a change in the ratio of solvent components. These runs may be compared with the standard reaction conditions illustrated in Runs 1, 2 and 3.

(6) Runs 11 and 13 illustrate the upper preferred solvent limit.

(7) Runs 17 and 18 illustrate the effect of a change in the ratio of solvent components, which results in an improved Izod impact value over the standard runs.

(8) Runs 19 and 20 illustrate the effect of a change in the ratio of solvent components in combination with incremental addition of the initiator.

(9) Runs 21 and 22 illustrate the more efficient use of the initiator which is due to incremental addition, with and without a change in the ratio of solvent components.

heat transfer and recovery of the product. The normal reaction rate with a 50/50 weight ratio benzene/hexane solvent is about 10% monomer conversion per hour, whereas with a 40/60 weight ratio benzene/hexane solvent mixture, the reaction rate rises to as high as 25% conversion per hour.

TABLE IV

| Run No. | Reaction Temp., °C. | Reaction Time, hrs. | Incremental addition, weight percent Bz₂O₂ | Incremental addition, weight percent Solvent | Time increment(s) added (hrs.) | Notched Izod impact[1] (ft.-lbs./in.) | Melt flow[2] (g./10 min.) | Benzene/hexane weight ratio Initial | Benzene/hexane weight ratio Final |
|---|---|---|---|---|---|---|---|---|---|
| *Without incremental addition* | | | | | | | | | |
| 1 | 70 | 14 | None | None | | 4.4 | 0.46 | 50/50 | 50/50 |
| 2 | 72 | 20 | None | None | | 4.2 | 0.44 | 50/50 | 50/50 |
| 3 | 75 | 13 | None | None | | 1.7 | 3.1 | 50/50 | 50/50 |
| *Incremental addition of solvent only* | | | | | | | | | |
| 4 | {70, 80} | {7.5, 4.5} | None | 33.3 | 3.2–6.8 | 3.5 | 0.73 | 50/50 | 50/50 |
| 5 | 75 | 15 | None | 33.3 | 2.8–5.3 | 2.6 | 2.4 | 50/50 | 50/50 |
| *Incremental addition of initiator only* | | | | | | | | | |
| 6 | 77 | | 38 | None | 3.0 | 4.0 | 1.6 | 50/50 | 50/50 |
| *Incremental addition of solvent and initiator* | | | | | | | | | |
| 7 | {70, 80} | {7.5, 4.5} | 15.0 | 33.3 | 3.2–6.8 | 4.2 | 0.32 | 50/50 | 50/50 |
| 8 | 77 | | 25.0 | 33.3 | 10.0 | 2.9 | 1.9 | 50/50 | 50/50 |
| 9 | 77 | 8 | 25.0 | 33.3 | 5.0–7.3 | 4.1 | 1.1 | 50/50 | 50/50 |
| 10 | 77 | | 31.0 | 33.3 | 2.0 | 3.7 | 2.9 | 50/50 | 50/50 |
| 11 | 78 | | 25.0 | 50.0 | 3.0 | 3.5 | 2.7 | 50/50 | 50/50 |
| 12 | 75 | | 25.0 | 25.0 | 1.5 | 4.5 | 2.1 | 50/50 | 50/50 |
| 13 | 75 | | 37.5 | 50.0 | 1.0 | 3.7 | 1.4 | 50/50 | 50/50 |
| 14 | 82 | 6 | 37.5 | 25.0 | 4.0 | 3.8 | 1.7 | 50/50 | 50/50 |
| 15 | 86 | | 42.5 | 33.3 | 4.0 | 2.4 | 4.4 | 50/50 | 50/50 |
| *Incremental addition with a change in the solvent ratio* | | | | | | | | | |
| 16 | {70, 80} | {12, 6} | None | 33.3 | 10.0 | 2.0 | 1.1 | 60/40 | 40/60 |
| 17 | 75 | | None | 33.3 | 1.5 | 6.1 | 0.23 | 60/40 | 40/60 |
| 18 | 70 | | None | 33.0 | 2.5 | 8.3 | 0.10 | 55/45 | 45/55 |
| 19 | 77 | 10 | 31.0 | 33.0 | 3.0 | 4.4 | 1.7 | 55/45 | 45/55 |
| 20 | 78 | | 35.0 | 26.0 | 3.5 | 4.4 | 1.9 | 53/47 | 45/55 |
| *Incremental addition with reduced initiator levels (3.8 parts of benzoyl peroxide)* | | | | | | | | | |
| 21 | 78 | 9 | 52.0 | 26.0 | 2.0–3.5 | 4.6 | 1.4 | 50/50 | 50/50 |
| 22 | 78 | | 30.0 | 26.0 | 3.5 | 4.3 | 1.7 | 53/47 | 45/55 |

[1] ASTM D 256–56, ⅛ inch specimen.
[2] ASTM D 1238–62T, condition G.

(10) Runs 9, 14, 19 and 21 illustrate that a reduced reaction time is possible under a variety of conditions when using incremental addition of solvent and/or initiator.

(11) Runs 9, 13 and 14 illustrate the limits of the times of incremental additions where good products are obtained.

(12) Runs 8 and 16 illustrate instances where the time of addition of the increments was too long for best results.

(13) Runs 17 and 18 illustrate the lower initiator limits and Run 21 the upper.

(14) Run 6 illustrates the lower solvent limit, and Runs 11 and 13 the upper solvent limit.

(15) Run 17 illustrates the preferred limits in the change in the ratio of solvent components.

(16) Runs 15 and 18 illustrate the preferred lower and upper temperature limits when benzoyl peroxide is the initiator.

Upon comparing the data in Table IV, it may be noted that an easy flowing rubber modified plastic product is produced by the standard reaction technique illustrated in Runs 1, 2 and 3, but only at a considerable sacrifice in impact strength over the optimum obtainable by the incremental addition technique. It is in this context that the Izod impact value/melt flow index relation is important. The higher ratios of the aliphatic solvent component lead to a higher conversion of the monomers, a lower viscosity for the reaction mixture, a higher molecular weight for the resin component even at high reaction temperatures, and a faster reaction rate. A lower viscosity for the reaction mixture is desirable as this aids in

What is claimed is:

1. A process for preparing rubber modified plastics comprising interpolymerizing in an organic solvent and in the presence of a free radical initiator about 1–50 parts by weight of a rubbery polymer of ethylene, at least one alpha monoolefin containing 3 to 16 carbon atoms and at least one polyene for each 99–50 parts by weight of monomeric material selected from the group consisting of alkenyl aromatic monomers, vinyl and vinylidene halides wherein the halogen content thereof is selected from the group consisting of fluorine, chlorine and bromine, acrylic monomers, and mixtures thereof, the organic solvent being a mixture of aromatic and aliphatic solvents which together form a solvent for the rubbery polymer and in which the aromatic solvent is selected from the group consisting of benzene, alkyl substituted benzenes wherein the alkyl group in each instance contains 1–4 carbon atoms, naphthalene, alkyl substituted naphthalenes wherein the alkyl group in each instance contains 1–4 carbon atoms and halogenated derivatives of said organic solvents and in which the aliphatic solvent is selected from the group consisting of paraffin hydrocarbons containing 5–15 carbon atoms and cycloparaffins containing 5–15 carbon atoms, the organic solvent being present in an amount of at least 35% by weight of the reaction mixture, and halogenated derivatives thereof, the alkenyl aromatic monomer being selected from the group consisting of alkenyl aromatic hydrocarbons having 8–20 carbon atoms and in which the acrylic monomer has the general formula

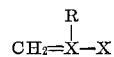

wherein R is selected from the group consisting of hydrogen and alkyl groups having 1–5 carbon atoms, and X is selected from the group consisting of

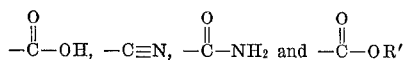

wherein R' is an alkyl group containing 1–9 carbon atoms, and wherein at least one of the ingredients of the reaction mixture selected from the group consisting of the solvent and the catalyst is added incrementaally during the course of the interpolymerization.

2. The process of claim 1 wherein about 4–25 parts by weight of the rubbery polymer are present for each 100 parts by weight of the monomeric material.

3. The process of claim 1 wherein the organic solvent is present in an amount of 35–90% by weight of the reaction mixture and is selected from the group consisting of benzene, toluene, xylene, ethyl benzene, and mixtures thereof as the aromatic component and paraffins and cycloparaffins containing six through eight carbon atoms as the aliphatic component.

4. The process of claim 1 wherein the rubbery polymer is a terpolymer of ethylene, at least one alpha monoolefin containing 3–16 carbon atoms, and 5-alkylidene-2-norbornene.

5. The process of claim 4 wherein the 5-alkylidene-2-norbornene is 5-ethylidene-2-norbornene.

6. The process of claim 1 wherein tthe monomeric material is styrene.

7. The process of claim 6 wherein the rubbery polymer is a terpolymer of ethylene, at least one alpha monoolefin containing 3–16 carbon atoms, and 5-alkylidene-2-norbornene.

8. The process of claim 7 wherein the 5-alkylidene-2-norbornene is 5-ethylidene-2-norbornene.

9. The process of claim 7 wherein the free radical catalyst comprises at least one substance selected from the group consisting of organic peroxides and organic hydroperoxides, and the terpolymer is present in an amount of 4–25 parts by weight for each 96–75 parts by weight of styrene.

10. The process of claim 1 wherein the monomeric material is a mixture of styrene and acrylonitrile, and the ratio of styrene to acrylonitrile is between 2:1 and 4:1.

11. The method of claim 10 wherein the rubbery polymer is an interpolymer of ethylene, at least one alpha monoolefin containing 3–16 carbon atoms, and 5-alkylidene-2-norbornene.

12. The process of claim 11 wherein the rubbery polymer is a terpolymer of ethylene, propylene and 5-ethylidene-2-norbornene.

13. The process of claim 12 wherein the free radical catalyst comprises at least one substance selected from the group consisting of organic peroxides and organic hydroperoxides, and the terpolymer is present in an amount of 4–25 parts by weight for each 96–75 parts by weight of styrene and acrylonitrile.

14. The process of claim 1 wherein the solvent is a mixed aromatic-aliphatic hydrocarbon solvent containing 35–65 parts by weight of the aromatic hydrocarbon component and 63–35 parts by weight of the aliphatic hydrocarbon component.

15. The process of claim 14 wherein the weight ratio of the aromatic solvent component to the aliphatic solvent component is reduced during the course of the interpolymerization.

16. The process of claim 15 wherein the organic solvent is present in an amount of 35–90% by weight of the final reaction mixture, up to 50% by weight of the solvent in the final reaction mixture is added incrementally during the interpolymerization, the aromatic component is selected from the group consisting of benzene, toluene, xylene, ethyl benzene, and mixtures thereof, and the aliphatic component is at least one hydrocarbon selected from the group consisting of paraffins and cycloparaffins containing six through eight carbon atoms.

17. The process of claim 16 wherein the ratio by weight of the aromatic solvent component to the aliphatic solvent component is between 60:40 and 40:60, the final reaction mixture contains 50–75% by weight of solvent, between 20% and 40% by weight of the solvent in the final reaction mixture is added incrementally, and the increments of solvent are added in the time interval between $\frac{1}{7}$ and $\frac{6}{7}$ of the total reaction time required to achieve at least 90% by weight conversion of the monomeric material.

18. The process of claim 1 wherein the final reaction mixture contains about 0.25–2.5 parts by weight of free radical catalyst, and up to 75% by weight of the catalyst is added incrementally as the interpolymerization proceeds.

19. The process of claim 18 wherein the increments of catalyst are added in the time interval between $\frac{1}{7}$ and $\frac{6}{7}$ of the total reaction time required to achieve at least 90% by weight conversion of the monomeric material, and the reaction temperature provides a catalyst half life of 2–13 hours.

20. The process of claim 19 wherein the catalyst comprises benzoyl peroxide, the reaction temperature is 68–85° C., and at least one increment of catalyst is added between one and ten hours after initiating the interpolymerization.

21. The process of claim 20 wherein 20–50% by weight of the catalyst is added incrementally, and the reaction temperature is 72–82° C. during at least a portion of the interpolymerization.

22. The process of claim 1 wherein the solvent is a mixed aromatic-aliphatic hydrocarbon solvent containing 35–65 parts by weight of the aromatic hydrocarbon component and 65–35 parts by weight of the aliphatic hydrocarbon component, the final reaction mixture contains about 0.25–2.5 parts by weight of the free radical catalyst, and up to 75% by weight of the catalyst is added incrementally as the interpolymerization proceeds.

References Cited

UNITED STATES PATENTS

| | | | |
|---|---|---|---|
| 3,151,173 | 9/1964 | Nyce | 260—666 |
| 3,166,524 | 1/1965 | Schmidle et al. | 260—880 |
| 3,271,477 | 9/1966 | Kresge | 260—878 |
| 3,311,675 | 3/1967 | Doak et al. | 260—880 |
| 3,317,635 | 5/1967 | Osmond | 260—880 |
| 3,397,166 | 8/1968 | Schmidle et al. | 260—880 |
| 3,432,577 | 3/1969 | Sernuik | 260—878 |
| 3,435,096 | 3/1969 | Lumbert et al. | 260—878 |
| 3,449,471 | 6/1969 | Weitzel et al. | 260—876 |
| 3,483,273 | 12/1969 | Prugnal et al. | 260—878 |
| 3,489,821 | 1/1970 | Witt et al. | 260—878 |

FOREIGN PATENTS 1,009,719  11/1965  Great Britain.

MURRAY TILLMAN, Primary Examiner

M. J. TULLY, Assistant Examiner

U.S. Cl. X.R.

260—4, 5, 876, 879, 880